US012381350B2

(12) United States Patent
Hashiguchi

(10) Patent No.: US 12,381,350 B2
(45) Date of Patent: Aug. 5, 2025

(54) CONNECTOR

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 366 days.

(21) Appl. No.: 18/108,793

(22) Filed: Feb. 13, 2023

(65) Prior Publication Data

US 2023/0299530 A1 Sep. 21, 2023

(30) Foreign Application Priority Data

Mar. 18, 2022 (JP) ................................ 2022-043301

(51) Int. Cl.

*H01R 13/115* (2006.01)
*H01R 12/57* (2011.01)
*H01R 13/405* (2006.01)
*H01R 107/00* (2006.01)

(52) U.S. Cl.

CPC ......... *H01R 13/405* (2013.01); *H01R 13/115* (2013.01); *H01R 2107/00* (2013.01)

(58) Field of Classification Search

CPC ...... H01R 12/57; H01R 12/716; H01R 12/73; H01R 13/115; H01R 13/2492; H01R 13/405; H01R 2107/00

See application file for complete search history.

(56) References Cited

U.S. PATENT DOCUMENTS 5,931,689 A * 8/1999 Patel ...................... H01R 13/20 439/74
6,881,075 B2 * 4/2005 Huang ................ H01R 12/716 439/74
7,384,274 B1 * 6/2008 Chen ................. H01R 12/7005 439/74
7,387,540 B1 * 6/2008 Van der Steen ..... H01R 12/716 439/570

(Continued)

FOREIGN PATENT DOCUMENTS

JP 2010073674 A 4/2010
JP 2010182608 A 8/2010

(Continued)

*Primary Examiner* — Abdullah A Riyami
*Assistant Examiner* — Thang H Nguyen
(74) *Attorney, Agent, or Firm* — Holtz, Holtz & Volek PC

(57) ABSTRACT

An insert molded body of a connector is provided with terminals and a holding member. A supporting beam portion of each terminal extends in a width direction. First and second supporting portions extend upward from end portions of the supporting beam portion, respectively. The first and the second supporting portions have resilience and support first and second contact points, respectively. The first and the second contact points face each other in the width direction. Protruding portions protrude from the supporting beam portion in a pitch direction. The supporting beam portion has a maximum size in the pitch direction which is equal to a maximum size of the first and the second supporting portion. The protruding portions are embedded in the holding member in part, so that the terminal is held by the holding member. The supporting beam portion is visible from above.

7 Claims, 18 Drawing Sheets

(56) References Cited

U.S. PATENT DOCUMENTS

| | | | | |
|---|---|---|---|---|
| 7,833,024 | B2 * | 11/2010 | Takeuchi | H01R 13/432 439/74 |
| 8,235,733 | B2 * | 8/2012 | Yamashiro | H01R 12/716 439/74 |
| 8,523,580 | B2 * | 9/2013 | Midorikawa | H01R 12/73 439/74 |
| 8,834,183 | B2 * | 9/2014 | Komoto | H01R 12/718 439/62 |
| 9,478,902 | B2 * | 10/2016 | Komoto | H01R 12/716 |
| 12,218,464 | B2 * | 2/2025 | Nakamura | H01R 13/64 |
| 2008/0299796 | A1 * | 12/2008 | Hoshino | H01R 13/41 439/72 |
| 2010/0068900 | A1 * | 3/2010 | Wu | H01R 12/716 439/74 |
| 2011/0070752 | A1 * | 3/2011 | Yamashiro | H01R 12/57 439/83 |
| 2014/0148022 | A1 * | 5/2014 | Mongold | H01R 12/73 439/74 |
| 2016/0126654 | A1 * | 5/2016 | Hashiguchi | H01R 4/16 439/851 |
| 2017/0125930 | A1 * | 5/2017 | Komoto | H01R 13/405 |
| 2019/0181575 | A1 * | 6/2019 | Schneider | H01R 13/115 |
| 2020/0112118 | A1 * | 4/2020 | Obata | H01R 12/91 |

FOREIGN PATENT DOCUMENTS

| | | | |
|---|---|---|---|
| JP | 2010182609 | A | 8/2010 |
| JP | 2010182611 | A | 8/2010 |
| JP | 2010205475 | A | 9/2010 |
| JP | 5369125 | B2 | 12/2013 |

* cited by examiner

CONNECTOR

CROSS REFERENCE TO RELATED APPLICATIONS

This application is based on and claims priority under 35 U.S.C. § 119 to Japanese Patent Application No. JP2022-043301 filed Mar. 18, 2022, the contents of which are incorporated herein in their entirety by reference.

BACKGROUND OF THE INVENTION

This invention relates to a connector, particularly, to a connector provided with a terminal having two contact points.

JPA 2010-182609 (Patent Document 1) discloses a connector which is provided with a plurality of terminals each of which has two contact points.

As shown in FIG. 30, a connector 90 is provided with a receptacle body portion 92 and a plurality of contact point units 94. Each of the contact point units 94 has a plurality of contact point members (terminals) 941 and a contact point support (a holding member) 943 which supports the contact point members 941. The contact point unit 94 is insert-molded, and each of the contact point members 941 is embedded in the contact point support 943 in part. The receptacle body portion 92 and the contact point units 94 are combined with each other and form the connector 90.

As shown in FIG. 30, each of the contact point members 941 has two contact portions 945. The two contact portions 945 are coupled with each other by an embedded plate portion (a supporting beam portion) so that they face each other. The embedded plate portion is embedded in the contact point support 943 as understood from the name thereof.

As understood from FIG. 30, in each of the contact point members 941, the two contact portions 945 are resiliently deformable. The two contact portions 945 allow a contact portion (not shown) of a plug contact point member (not shown) to be inserted therebetween. Each of the two contact portions 945 has a contact point which is contactable with the contact portion of the plug contact point member. The two contact points are supported by the contact portions 945, respectively, which are resiliently deformable, so that the connector 90 of Patent Document 1 can achieve high contact reliability.

In the connector 90 disclosed in Patent Document 1, the embedded plate portion (the supporting beam portion) of the contact point member 941 is embedded in the contact point support (the holding member) 943. In other words, the contact point support 943 covers an upper surface of the embedded plate portion in a mating direction. Accordingly, the connector 90 of Patent Document 1 has no other choice but to increase a length of the contact portion 945 in the mating direction in order to give a predetermined size to a receiving portion for receiving the contact portion (not shown) of the plug contact point member (not shown). As a result, the connector 90 of Patent Document 1 has a problem that it is hard to reduce a height thereof.

SUMMARY OF THE INVENTION

It is an object of the present invention to provide a connector which is provided with a terminal having two contact points and supporting portions supporting the contact points, respectively, and can reduce a height thereof.

One aspect of the present invention provides a connector which comprises an insert molded body. The insert molded body comprises a plurality of terminals and a holding member. The terminals are arranged in a pitch direction. Each of the terminals has a supporting beam portion, a first supporting portion, a first contact point, a second supporting portion, a second contact point and a protruding portion. The supporting beam portion extends in a width direction perpendicular to the pitch direction. The first supporting portion extends upward in an up-down direction perpendicular to both the pitch direction and the width direction from one of end portions of the supporting beam portion and has resilience. The first contact point is supported by the first supporting portion. The second supporting portion extends upward in the up-down direction from a remaining one of the end portions of the supporting beam portion and has resilience. The second contact point is supported by the second supporting portion so that the second contact point faces the first contact point in the width direction. The protruding portion protrudes from the supporting beam portion in the pitch direction. The supporting beam portion has a maximum size same as that of the first supporting portion and as that of the second supporting portion in the pitch direction. The protruding portion is embedded in the holding member in part, so that the terminal is held by the holding member. The supporting beam portion is visible from above in the up-down direction.

In the connector according to the aspect of the present invention, each of the terminals has the first contact point and the second contact point which face each other in the width direction. The first contact point and the second contact point are supported by the first supporting portion and the second supporting portion, respectively. The first supporting portion and the second supporting portion extend upward from one and the other of the ends of the supporting beam portion, respectively. Each of the terminals has the protruding portion protruding from the supporting beam portion in the pitch direction. The protruding portion is embedded in the holding member in part, so that the terminal is held by the holding member. The supporting beam portion is visible from above. In other words, the holding member is not on the upper surface of the supporting beam portion. Accordingly, in the up-down direction, it is possible to increase a size of the receiving portion for receiving the mating terminal. As a result, in the up-down direction, it is possible to reduce sizes of the first supporting portion and the second supporting portion which support the first contact point and the second contact point, respectively, so that it is possible to reduce the height of the connector.

An appreciation of the objectives of the present invention and a more complete understanding of its structure may be had by studying the following description of the preferred embodiment and by referring to the accompanying drawings.

Figure 1:
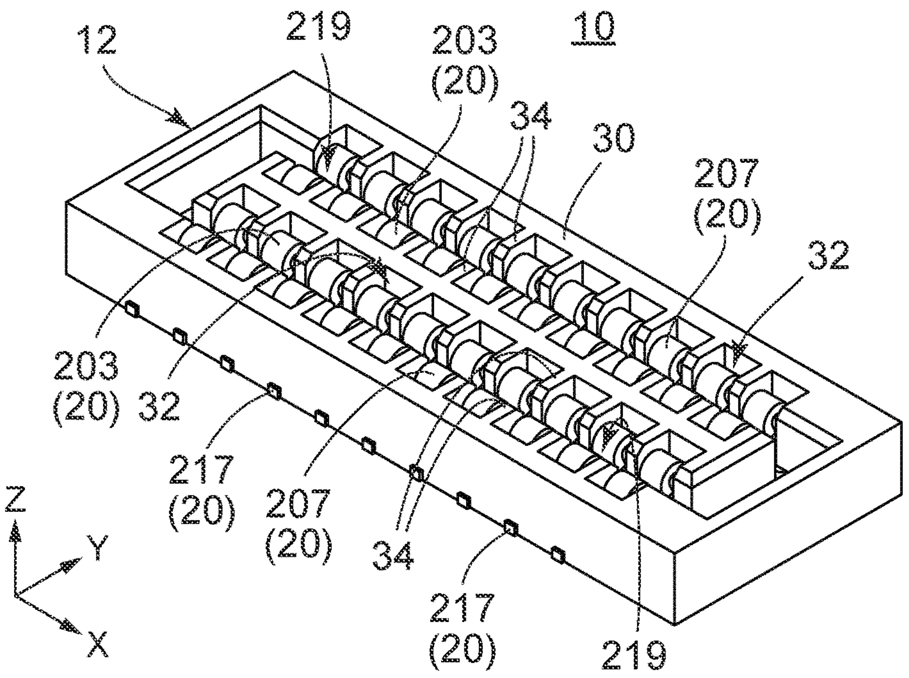
FIG. 1 is a top, perspective view showing a connector according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 2:
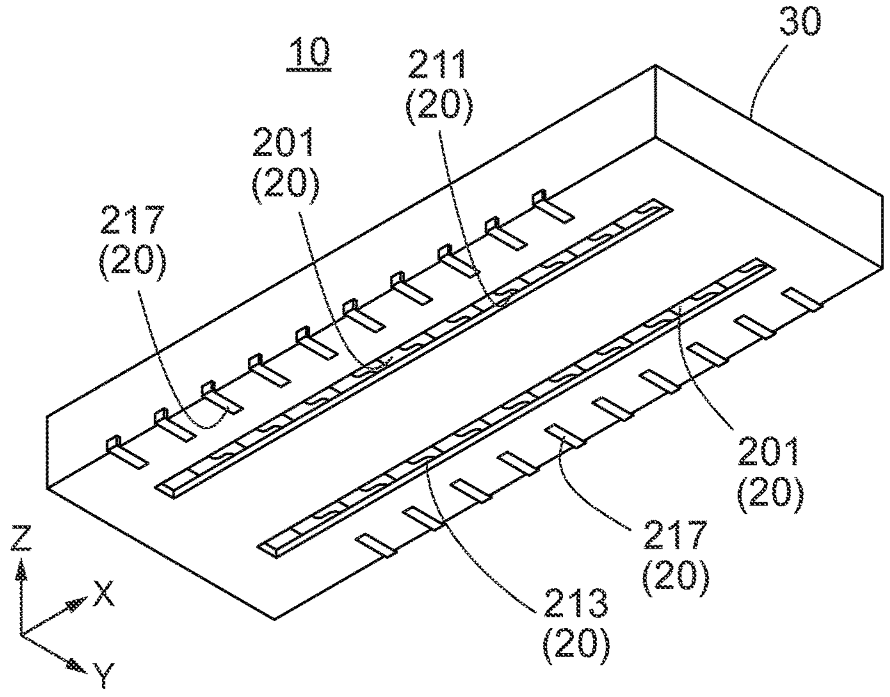
FIG. 2 is a bottom, perspective view showing the connector of FIG. 1.

Referring to FIGS. 1 and 2, a connector 10 according to a first embodiment of the present invention is provided with a plurality of terminals 20 and a housing 30. In the present embodiment, the holding member 30 together with the terminals 20 are insert-molded by using insulating resin. Thus, the connector 10 of the present embodiment is provided with an insert molded body 12, and the insert molded body 12 is provided with the terminals 20 and the holding member 30.

Figure 3:
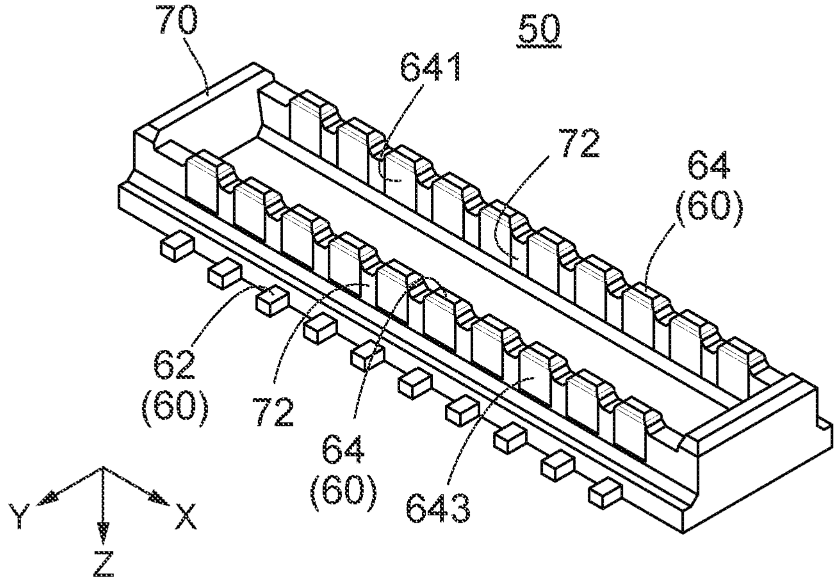
FIG. 3 is a bottom, perspective view showing a mating connector mateable with the connector of FIG. 1.

As shown in FIGS. 1 and 2, the connector 10 of the present embodiment has a generally rectangular parallelepiped shape with a low height. The connector 10 is a board mounting type connector. The connector 10 is mateable with and separable from a mating connector 50, which is formed as shown in FIG. 3, for example, in an up-down direction. In the present embodiment, the up-down direction is a Z-direction. A positive Z-direction is directed upward while a negative Z-direction is directed downward.

Referring to FIG. 3, the mating connector 50 is provided with a plurality of mating terminals 60 and a mating holding member 70. In the present embodiment, the mating holding member 70 together with the mating terminals 60 are insert-molded by using insulating resin. However, the present invention is not limited thereto. The mating terminals 60 may be held by the mating holding member 70 by means of any other method, for example, press-fitting.

As shown in FIG. 3, the mating holding member 70 has a generally rectangular frame shape. The mating terminals 60 are arranged in two rows along long edges 72 of the mating holding member 70 and form two mating terminal rows. In each of the mating terminal rows, the mating terminals 60 are arranged in the pitch direction at predetermined intervals. The two mating terminal rows are arranged in a width direction perpendicular to the pitch direction. In the present embodiment, the pitch direction is an X-direction, and the width direction is a Y-direction.

As understood from FIG. 3, each of the mating terminals 60 has an L-shape when viewed along the pitch direction. Each of the mating terminals 60 is provided with a mating mounting portion 62 and a connection portion 64. The mating mounting portion 62 extends in the width direction and protrudes from the mating holding member 70. The connection portion 64 extends downward in an up-down direction perpendicular to both the pitch direction and the width direction or extends in a negative Z-direction. The connection portion 64 has a pair of contact point portions 641 and 643 which are exposed outward in the width direction.

Figure 4:
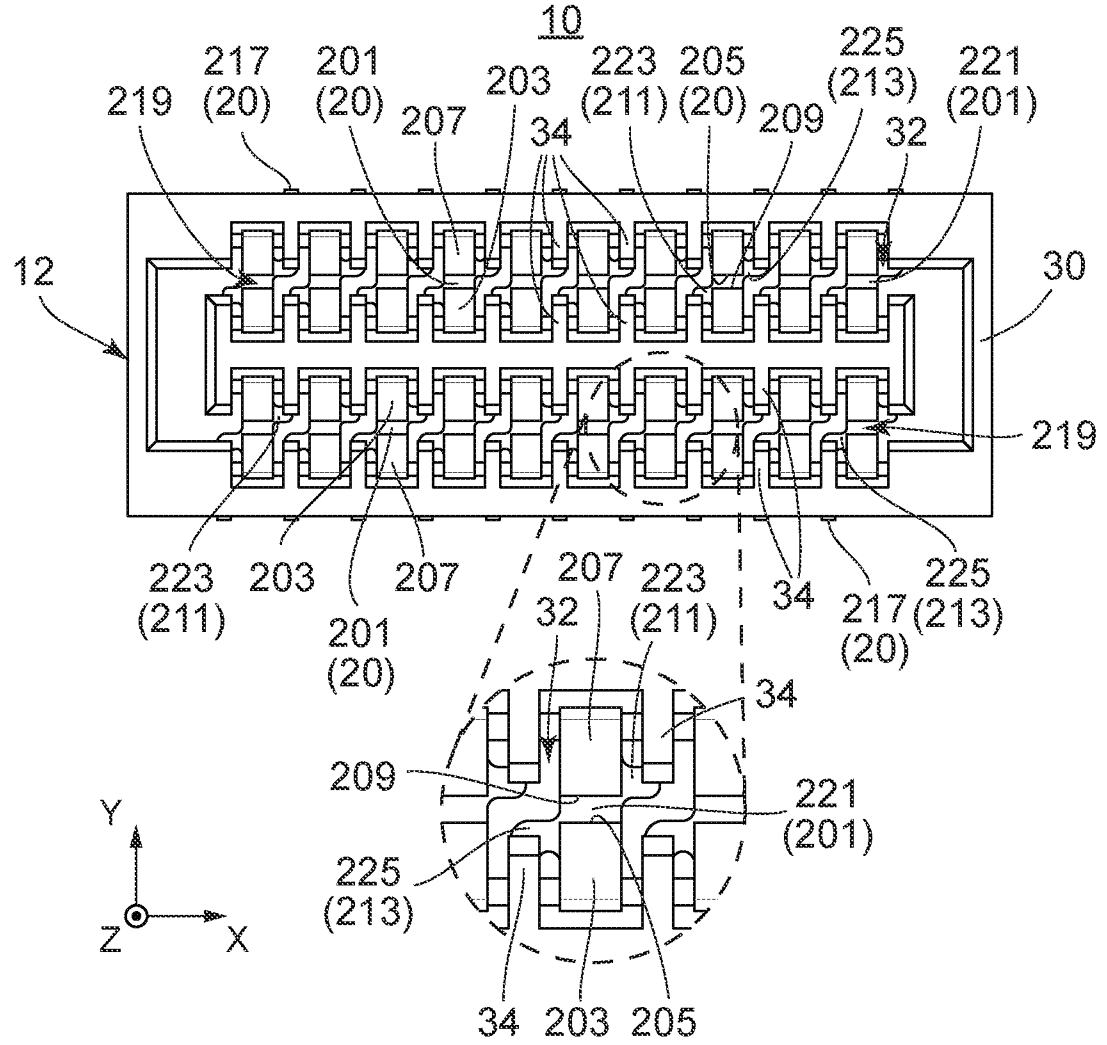
FIG. 4 is a plan view showing the connector of FIG. 1. A part of the connector is enlarged and depicted.
Figure 5:
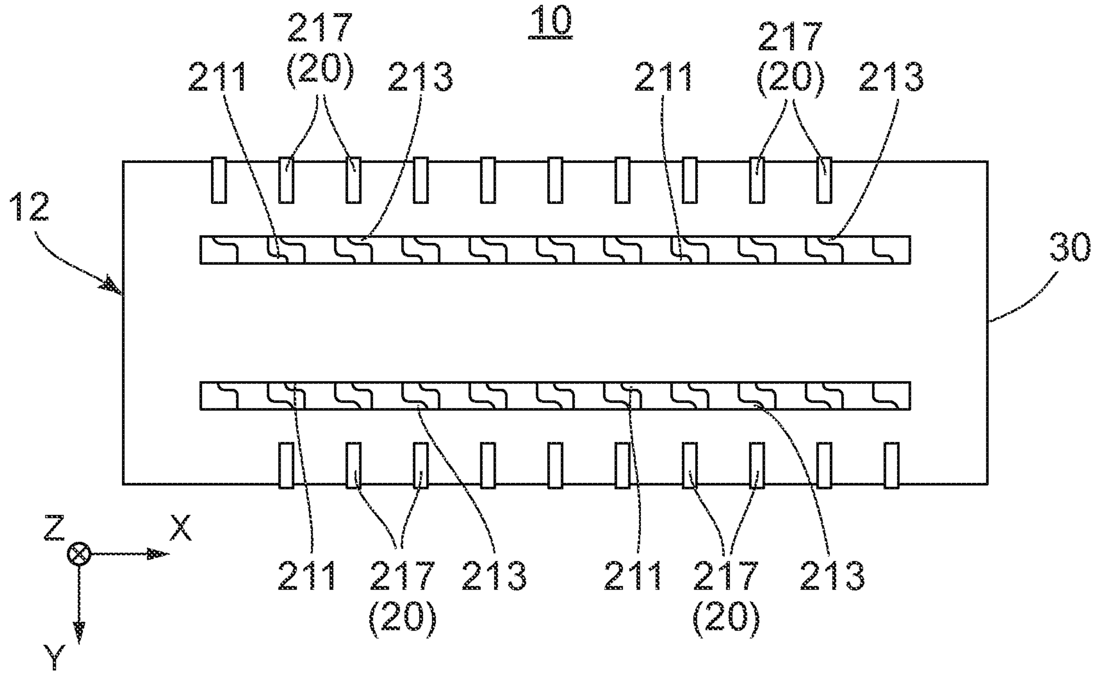
FIG. 5 is a bottom view showing the connector of FIG. 1.
Figure 6:
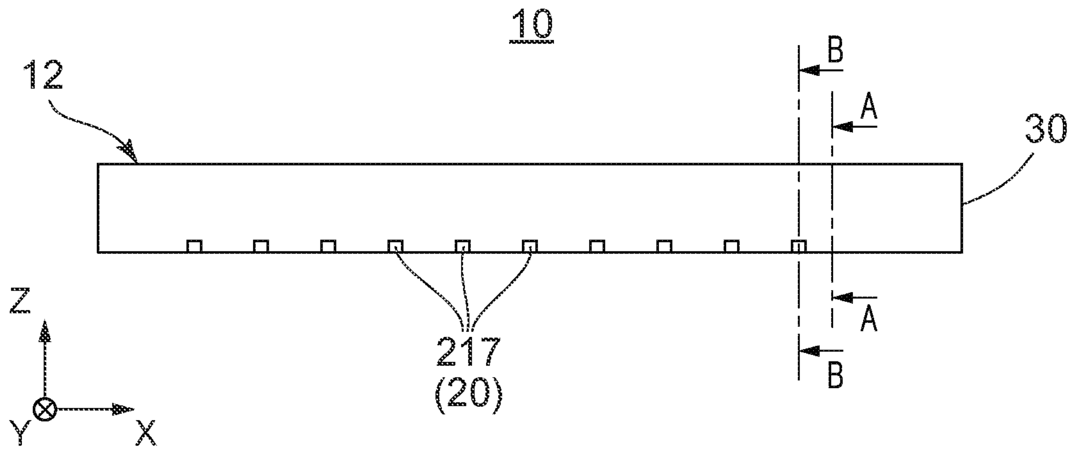
FIG. 6 is a side view showing the connector of FIG. 1.

As shown in FIGS. 4 to 6, the terminals 20 of the connector 10 are arranged so that they correspond to the mating terminals 60 (see FIG. 3), respectively. In detail, the terminals 20 are arranged in two rows and form two terminal rows. In each of the terminal rows, the terminals 20 are arranged in the pitch direction at predetermined intervals.

Referring to FIGS. 9 to 14, each of the terminals 20 has a supporting beam portion 201, a first supporting portion 203, a first contact point 205, a second supporting portion 207, a second contact point 209, a first protruding portion 211 and a second protruding portion 213. Each of the terminals 20 further has a bent portion 215 extending from the second protruding portion 213 and a mounting portion 217 extending from the bent portion 215. Each of the terminals 20 is formed by punching and bending a sheet metal, for example.

Figure 9:
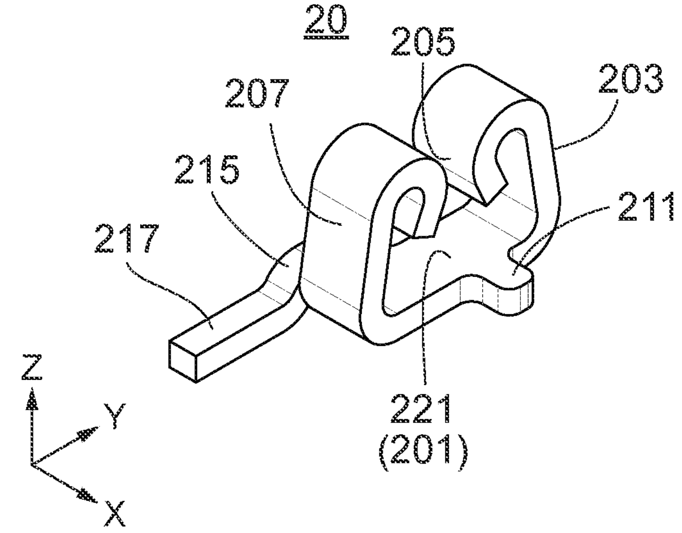
FIG. 9 is a top, perspective view showing one of terminals belonging to one of terminal rows included in the connector of FIG. 1.
Figure 13:
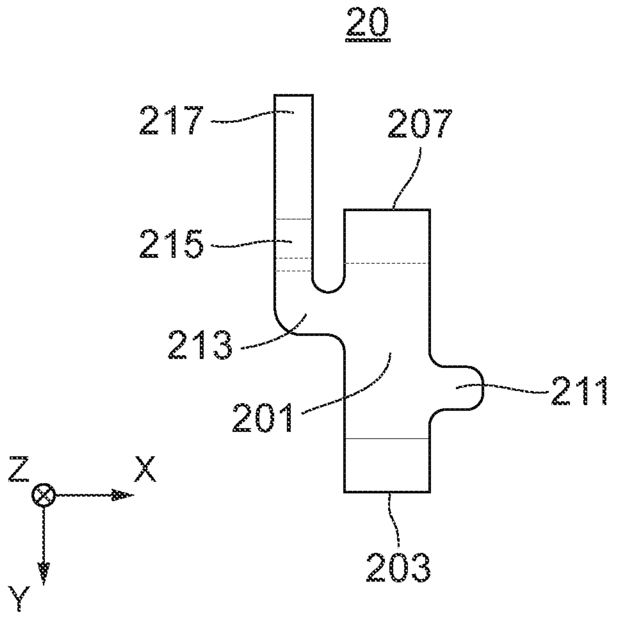
FIG. 13 is a bottom view showing the terminal of FIG. 8.
Figure 14:
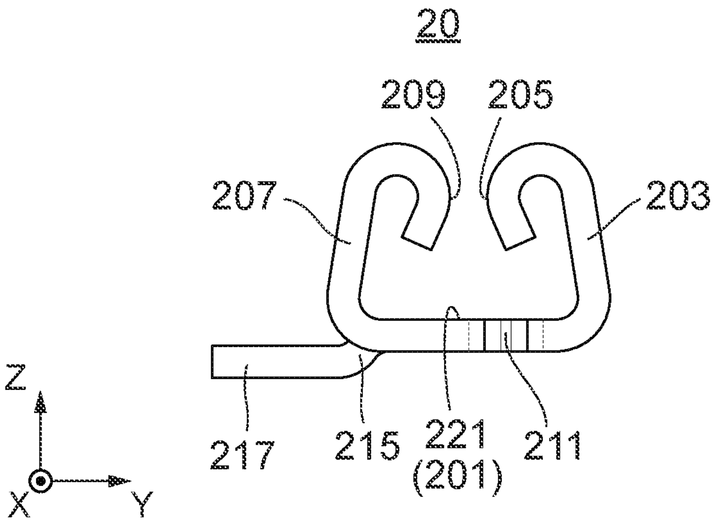
FIG. 14 is a front view showing the terminal of FIG. 8.

As shown in FIGS. 9 and 14, the supporting beam portion 201 extends in the width direction. As understood from FIGS. 12 and 13, the supporting beam portion 201 of the present embodiment has a constant size in the pitch direction. However, the present invention is not limited thereto. In the pitch direction, the size of the supporting beam portion 201 may not be constant. For example, when each of end portions of the supporting beam portion 201 has a maximum size in the pitch direction, a middle portion of the supporting beam portion 201 in the width direction may have a size smaller than the maximum size in the pitch direction.

Figure 10:
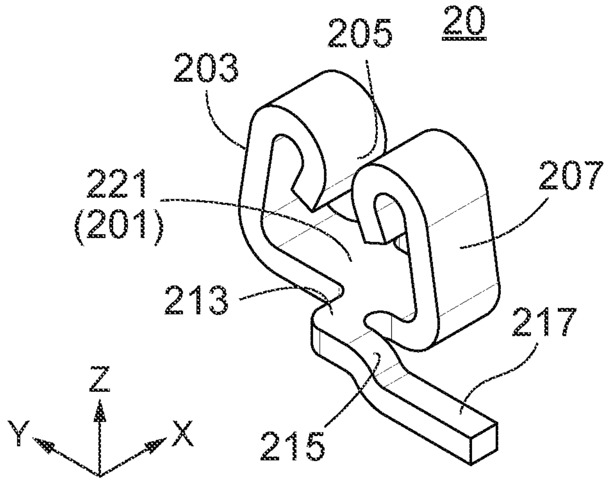
FIG. 10 is another top, perspective view showing the terminal of FIG. 8.
Figure 11:
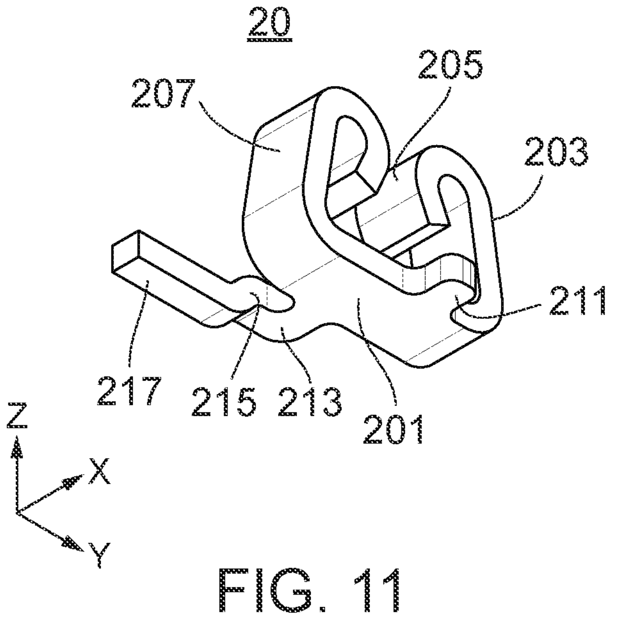
FIG. 11 is a bottom, perspective view showing the terminal of FIG. 8.

As shown in FIGS. 9 to 11, the first supporting portion 203 extends upward in the up-down direction from one of end portions of the supporting beam portion 201. The second supporting portion 207 extends upward in the up-down direction from a remaining one of the end portions of the supporting beam portion 201. In the present embodiment, the first supporting portion 203 and the second supporting portion 207 extend diagonally upward so that they get close to each other.

In detail, as shown in FIG. 14, the first supporting portion 203 extends diagonally upward from one of the end portions of the supporting beam portion 201, is bent inward in the width direction at an angle of 180 degrees or more and extends diagonally downward. The second supporting portion 207 extends diagonally upward from the remaining one of the end portions of the supporting beam portion 201, is bent inward in the width direction at an angle of 180 degrees or more and extends diagonally downward. However, the present invention is not limited thereto. Each of the first supporting portion 203 and the second supporting portion 207 may be bent outward in the width direction.

Figure 12:
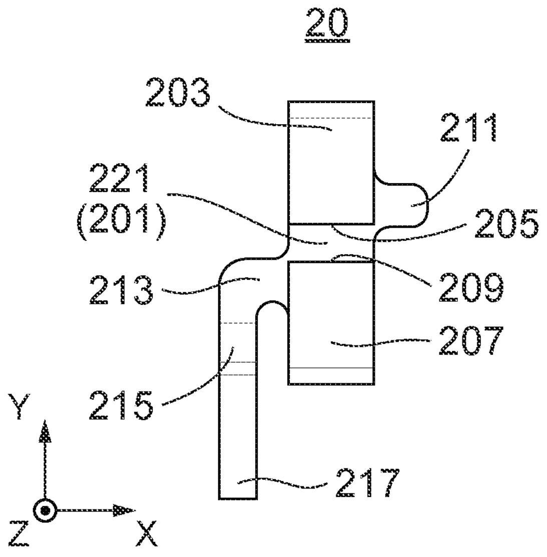
FIG. 12 is a plan view showing the terminal of FIG. 8.

As understood from FIG. 12, in the pitch direction, a size of the first supporting portion 203 is constant and matches the size of the supporting beam portion 201. However, the present invention is not limited thereto. In the pitch direction, the size of the first supporting portion 203 may be reduced toward a tip thereof. The same applies to the second supporting portion 207. Additionally, in any of the cases, in the pitch direction, the maximum size of the supporting beam portion 201 is equal to the maximum size of the first supporting portion 203 or the second supporting portion 207.

As shown in FIG. 14, the first contact point 205 is supported by the first supporting portion 203 while the second contact point 209 is supported by the second supporting portion 207. In detail, the first contact point 205 is a part of a surface of the first supporting portion 203 while the second contact point 209 is a part of a surface of the second supporting portion 207. The first contact point 205 and the second contact point 209 are supported by the first supporting portion 203 and the second supporting portion 207, respectively, so that they face each other in the width direction.

As shown in FIG. 14, the first contact point 205 and the second contact point 209 are apart from each other in the width direction. Each of the first supporting portion 203 and the second supporting portion 207 has resilience. When at least one of the first supporting portion 203 and the second supporting portion 207 is resiliently deformed, a distance between the first contact point 205 and the second contact point 209 is varied. Accordingly, when the connector 10 and the mating connector 50 (see FIG. 3) are mated with each other, the mating terminal 60 (see FIG. 3) can be entered between the first contact point 205 and the second contact point 209. In other words, when the connector 10 and the mating connector 50 are mated with each other, a receiving portion 219 can receive the mating terminal 60.

As shown in FIGS. 12 and 13, each of the first protruding portion 211 and the second protruding portion 213 protrudes from the supporting beam portion 201 in the pitch direction. The first protruding portion 211 and the second protruding portion 213 protrude in opposite directions. In other words, the first protruding portion 211 and the second protruding portion 213 protrude outward in the pitch direction. In detail, the first protruding portion 211 protrudes forward in a front-rear direction while the second protruding portion 213 protrudes rearward in the front-rear direction. In the present embodiment, the front-rear direction coincides with the pitch direction. A positive X-direction is directed forward while a negative X-direction is directed rearward.

Figure 15:
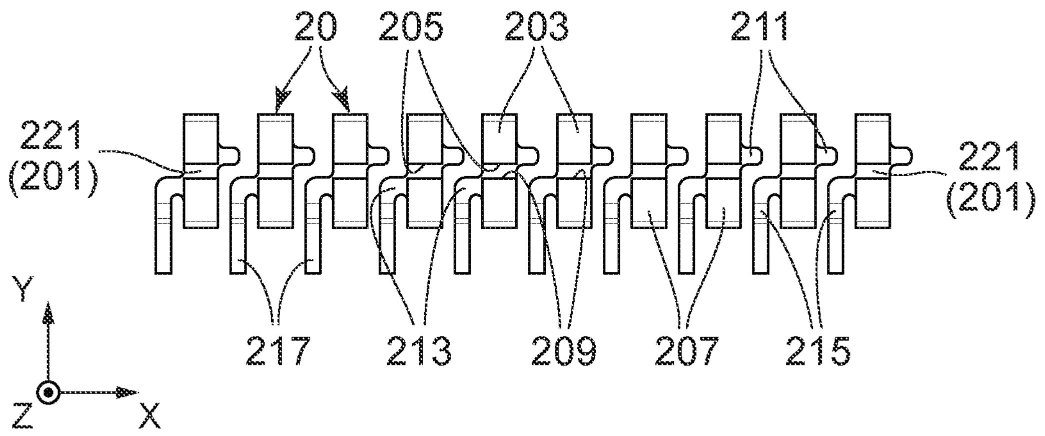
FIG. 15 is a plan view showing the terminals belonging to one of the terminal rows included in the connector of FIG. 1.

As shown in FIGS. 12 and 13, the first protruding portion 211 and the second protruding portion 213 are different from each other in position in the width direction. In detail, in the width direction, when the first protruding portion 211 occupies a first region while the second protruding portion 213 occupies a second region, the first region and the second region do not overlap with each other. Accordingly, when the terminals 20 are arranged in the pitch direction, pitch intervals of the terminals 20 can be reduced so that each of the pitch intervals is smaller than the maximum size of the terminal 20 in the pitch direction as shown in FIG. 15. As a result, the connector 10 can be downsized in the pitch direction.

As understood from FIGS. 10, 11 and 14, in the up-down direction, the second protruding portion 213 and the mounting portion 217 are different from each other in position. In detail, in the up-down direction, the mounting portion 217 is located downward of the second protruding portion 213. The bent portion 215 couples between the second protruding portion 213 and the mounting portion 217 which are different from each other in position in the up-down direction. When the connector 10 is mounted on an object (not shown), such as a substrate, the mounting portion 217 is connected and fixed to a mounted portion (not shown), such as a pad, of the object.

As understood from FIG. 4, one of the terminal rows and the other of the terminal rows are arranged in rotational symmetry about an axis along the up-down direction.

As shown in FIGS. 1 and 4, the holding member 30 has a pair of wall portions 34 between two of the terminals 20 which are adjacent to each other in the pitch direction.

As understood from FIG. 4, when viewed from above, one of the wall portions 34 forming a pair covers the first protruding portion 211 of one of the adjacent two terminals 20 in part. The other of the wall portions 34 forming the pair covers the second protruding portion 213 of the other of the adjacent two terminals 20 in part. In more detail, as understood from FIGS. 4 and 8, each of the first protruding portion 211 and the second protruding portion 213 is in part embedded in the wall portion 34 of the holding member 30 which corresponds thereto. Thus, the terminals 20 are held by the holding member 30.

Figure 8:
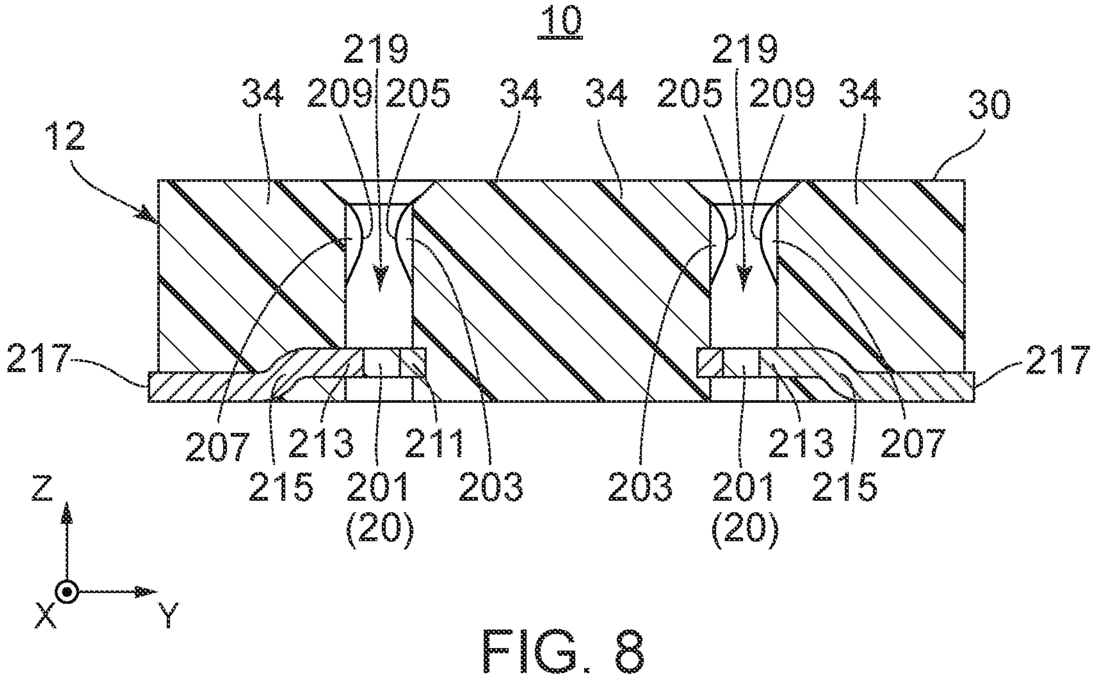
FIG. 8 is a cross-sectional view showing the connector of FIG. 6, taken along line B-B.

As shown in FIG. 8, in the present embodiment, also the bent portion 215 of the terminal 20 is also embedded in the wall portion 34 of the holding member 30 which corresponds thereto. A resin forming the holding member 30 exists on upper and lower sides of the bent portion 215, so that a holding force of the holding member 30 for holding the terminal 20 can be increased.

In the structure shown in FIGS. 4 and 8, the wall portions 34 function as regulating portions which regulate upward movement of the terminals 20. Each of the first protruding portion 211 and the second protruding portion 213 functions as a regulated portion of which upward movement is regulated by the regulating portion. Thus, each of the terminals 20 has the regulated portions while the holding member 30 has the regulating portions located upward of the regulated portions. In the present embodiment, the regulated portion is a part of the first protruding portion 211 or the second protruding portion 213. The bent portion 215 also forms the regulated portion together with the part of the second protruding portion 213. Moreover, in the present embodiment, the wall portion 34 is located upward of the regulated portion of the terminal 20 at least in part and functions as the regulating portion.

Figure 7:
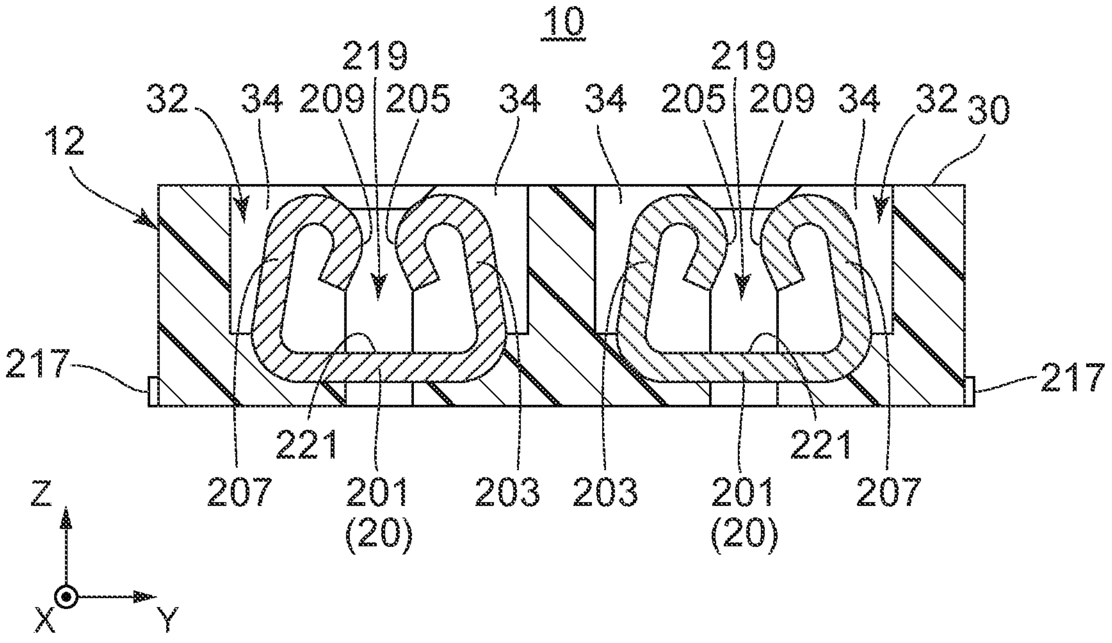
FIG. 7 is a cross-sectional view showing the connector of FIG. 6, taken along line A-A.

As understood from FIGS. 5 and 7, each of the end portions of the supporting beam portion 201 and the vicinity thereof are covered from beneath by the holding member 30. Accordingly, the terminal 20 is prevented from coming off from the holding member 30.

As shown in FIGS. 1 and 4, when viewed from above, the first supporting portion 203, the second supporting portion 207 and the supporting beam portion 201 of each of the terminals 20 are surrounded by a space 32. In other words, the holding member 30 defines the space 32 which surrounds the first supporting portion 203, the second supporting portion 207 and the supporting beam portion 201 of each of the terminals 20. The space 32 is formed by arranging a die or mold (not shown) when the insert molded body 12 is insert-molded. The die prevents the resin forming the holding member 30 from filling on an upper surface 221 of the supporting beam portion 201. Accordingly, as understood from FIGS. 4 and 7, the holding member 30 does not exist on the upper surface 221 of the supporting beam portion 201. Thus, the supporting beam portion 201 is visible from above in the up-down direction. In addition, each of the first protruding portion 211 and the second protruding portion 213 has an exposed portion 223 or 225 which is visible when viewed from above. The exposed portion 223 of the first protruding portion 211 and the exposed portion 225 of the second protruding portion 213 are adjacent to the supporting beam portion 201 in the pitch direction.

As understood from FIG. 7, in the connector 10 of the present embodiment, the holding member 30 does not exist on the upper surface 221 of the supporting beam portion 201, so that the holding member 30 does not cause reduction of a size of the receiving portion 219 in the up-down direction. Accordingly, in the up-down direction, it is unnecessary to increase sizes of the first supporting portion 203 and the second supporting portion 207 in order to give a predetermined size to the receiving portion 219. In other words, even if the sizes of the first supporting portion 203 and the second supporting portion 207 are reduced, the connector 10 of the present embodiment can secure the predetermined size for the receiving portion 219 in the up-down direction. As a result, according to the present embodiment, the connector 10 can be reduced in height.

Second Embodiment

Figure 16:
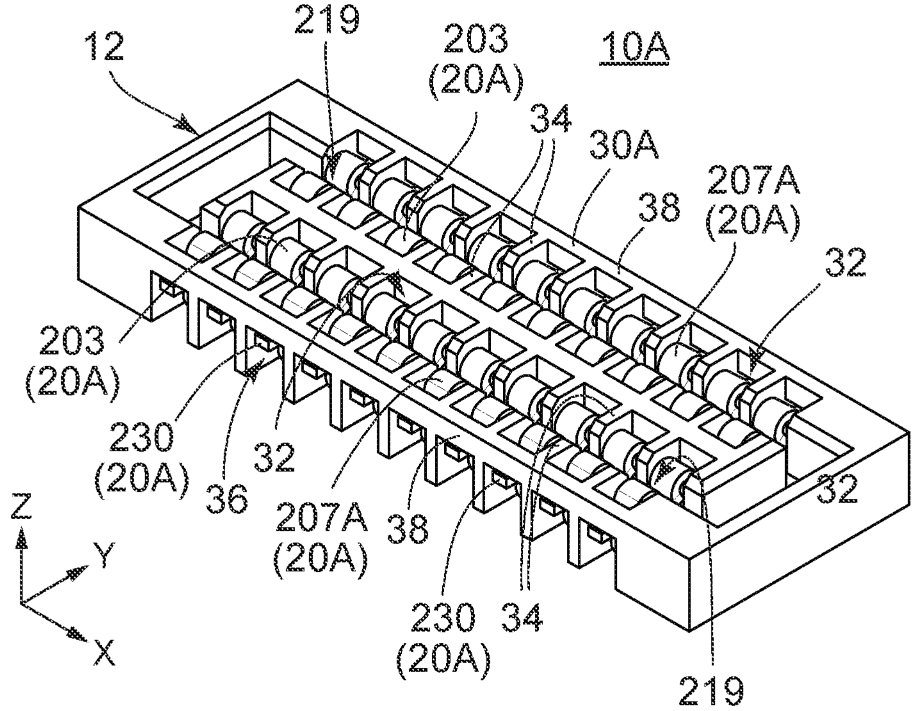
FIG. 16 is a top, perspective view showing a connector according to a second embodiment of the present invention.
Figure 17:
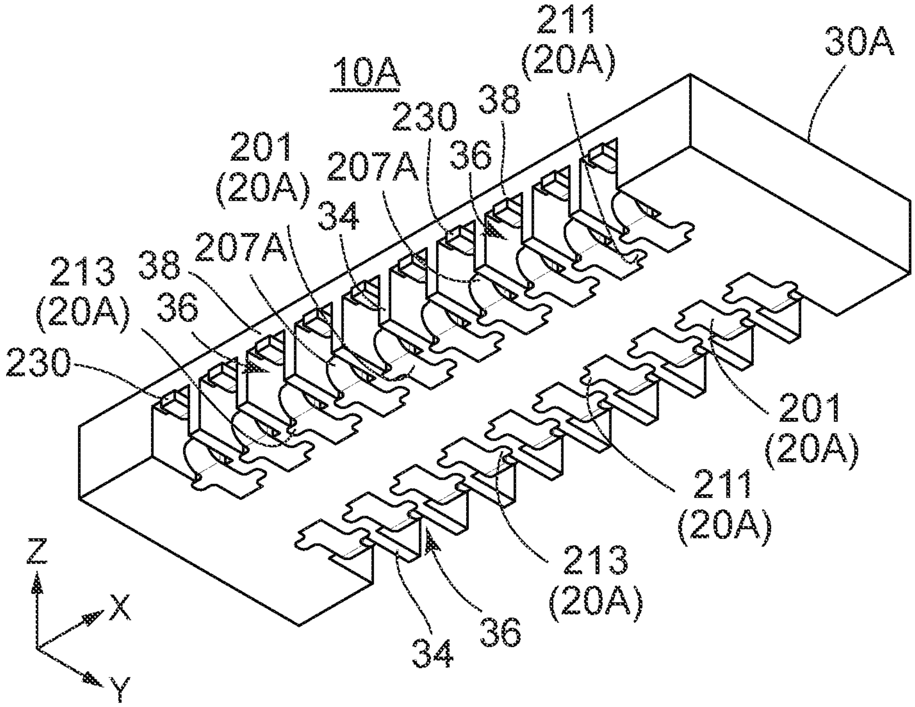
FIG. 17 is a bottom, perspective view showing the connector of FIG. 16.
Figure 18:
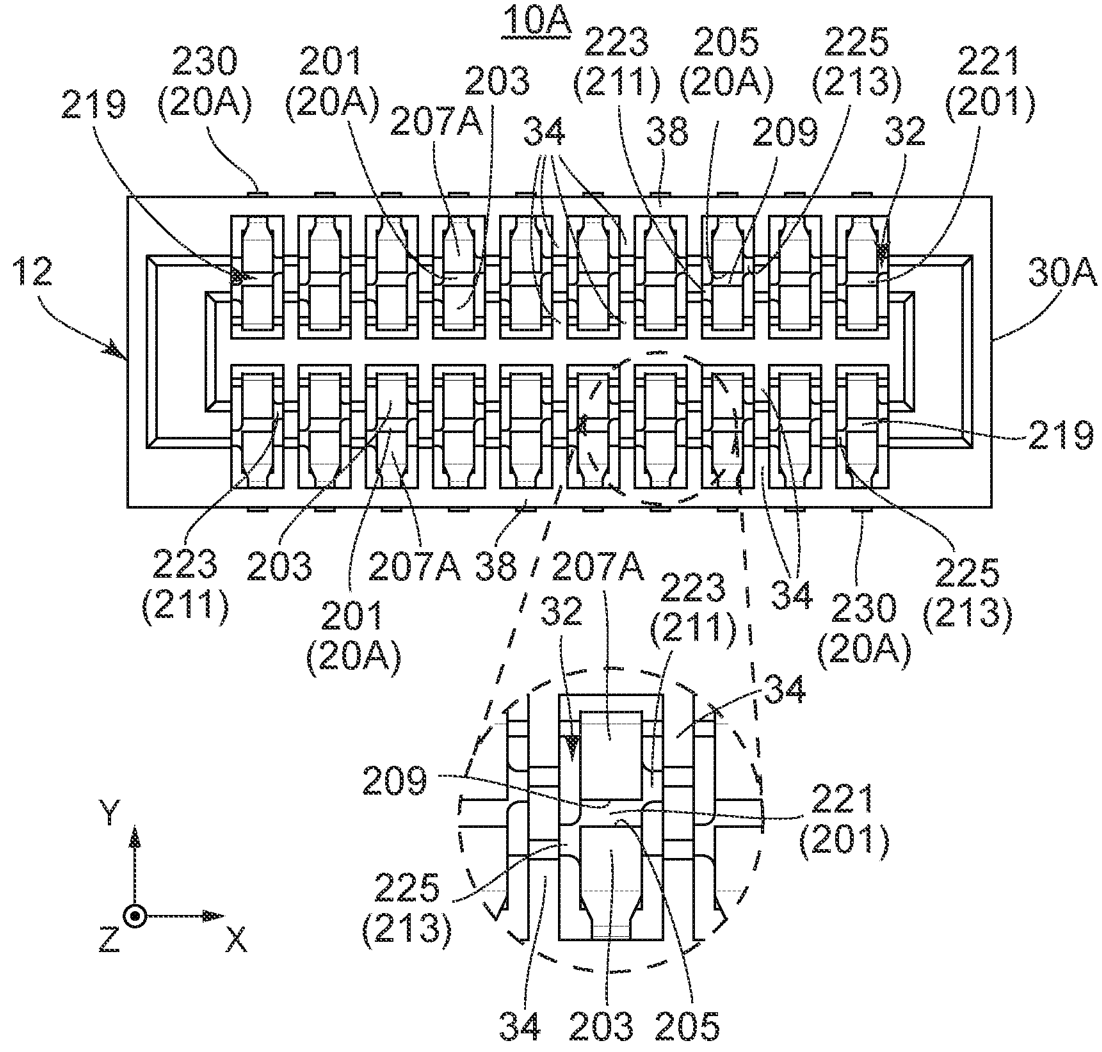
FIG. 18 is a plan view showing the connector of FIG. 16. A part of the connector is enlarged and depicted.

Referring to FIGS. 16 and 17, a connector 10A according to a second embodiment of the present invention is provided with a plurality of terminals 20A and a holding member 30A. The holding member 30A together with the terminals 20A are insert-molded by using insulating resin. Each of the terminals 20A is different in shape from the terminal 20 of the first embodiment. In accordance with this, the holding member 30A is different in shape from the holding member 30 of the first embodiment. However, the connector 10A of the present embodiment and the connector 10 of the first embodiment have a point of being mateable with the mating connector 50 shown in FIG. 3 in common. Hereinafter, components same as or similar to those of the connector 10 of the first embodiment shall be denoted by same or similar reference numerals, and the description thereabout is omitted. The following description will be mainly made about different points between the connector 10A of the present embodiment and the connector 10 of the first embodiment.

Referring to FIGS. 23 to 28, each of the terminals 20A has a supporting beam portion 201, a first supporting portion 203, a first contact point 205, a second supporting portion 207A, a second contact point 209, a first protruding portion 211, a second protruding portion 213 and an extension portion 230. As understood from a comparison between FIGS. 26 and 27 and FIGS. 12 and 13, the connector 10A does not have the bent portion 215 and the mounting portion 217. In the present embodiment, when the connector 10A is mounted on an object (not shown), the supporting beam portion 201 is connected and fixed to a mounted portion (not shown) of the object instead of the mounting portion 217.

Figure 26:
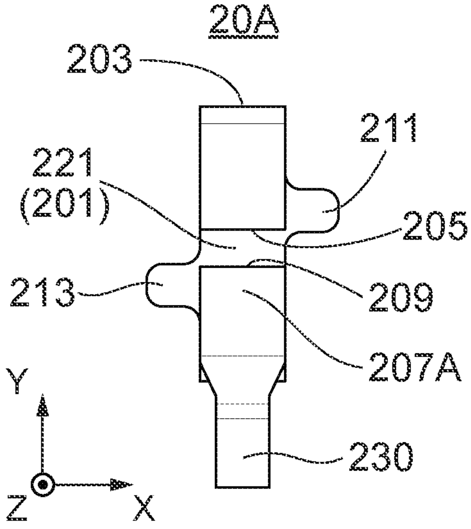
FIG. 26 is a plan view showing the terminal of FIG. 23.
Figure 27:
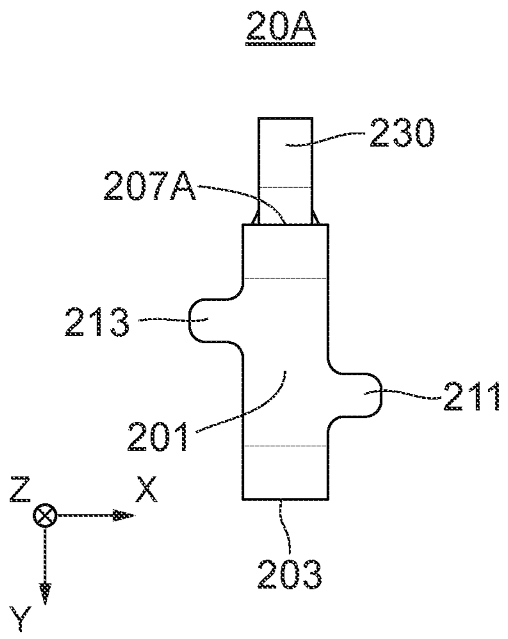
FIG. 27 is a bottom view showing the terminal of FIG. 23.
Figure 28:
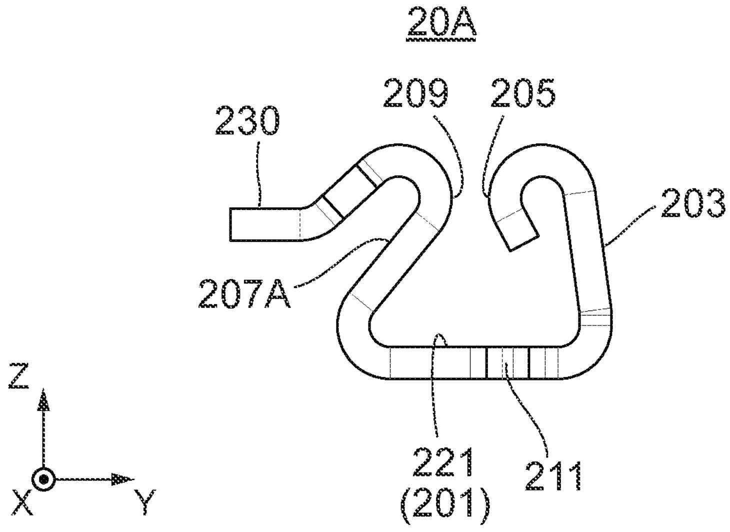
FIG. 28 is a front view showing the terminal of FIG. 23.

As shown in FIG. 28, the second supporting portion 207A is bent at an angle close to 180 degrees on an opposite side of the first supporting portion 203. In other words, the second supporting portion 207A is bent outward in the width direction at an angle of about 180 degrees. The extension portion 230 extends from a tip of the second supporting portion 207A in the width direction. As shown in FIG. 26, in the pitch direction, a size of an end portion of the second supporting portion 207A is reduced as it approaches the tip of the end portion. In the pitch direction, the extension portion 230 is smaller than the supporting beam portion 201 in size.

Figure 29:
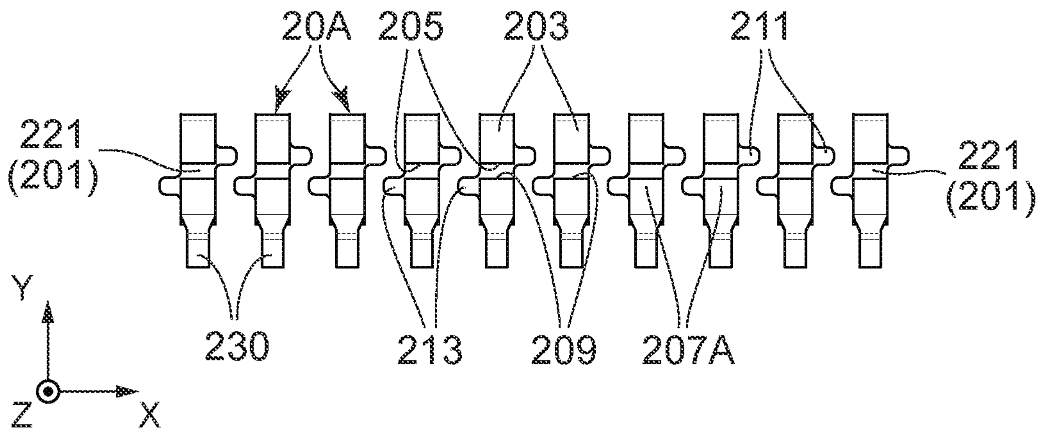
FIG. 29 is a plan view showing the terminals belonging to one of the terminal rows included in the connector of FIG. 16.
Figure 30:
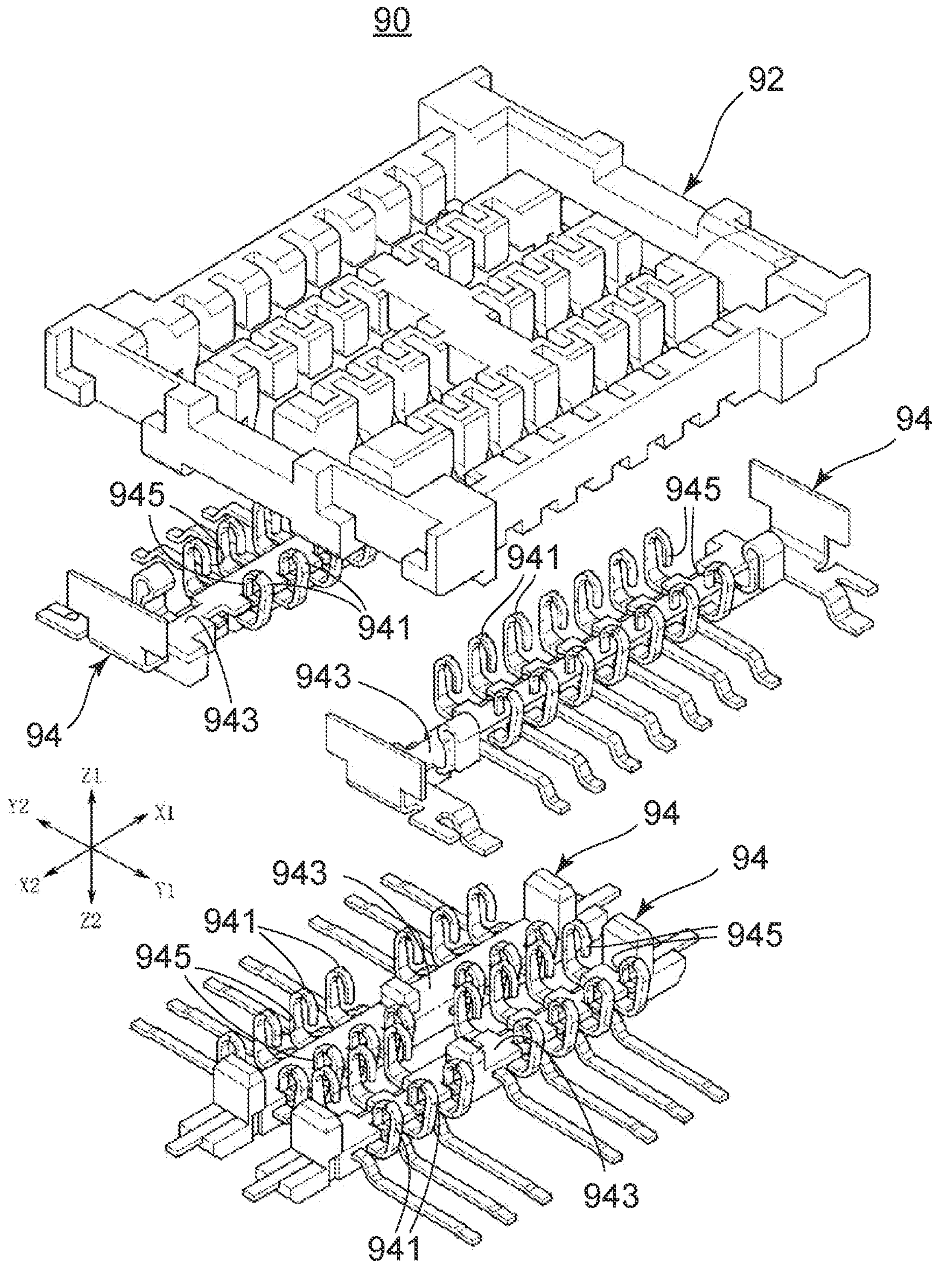
FIG. 30 PRIOR ART
FIG. 30 is an exploded, perspective view showing a connector described in Patent Document 1.

As shown in FIG. 29, the first protruding portion 211 and the second protruding portion 213 are different from each other in position in the width direction, so that, also in the connector 10A according to the present embodiment, pitch intervals of the terminals 20A can be reduced. Accordingly, the connector 10A can be downsized in the pitch direction.

Figure 19:
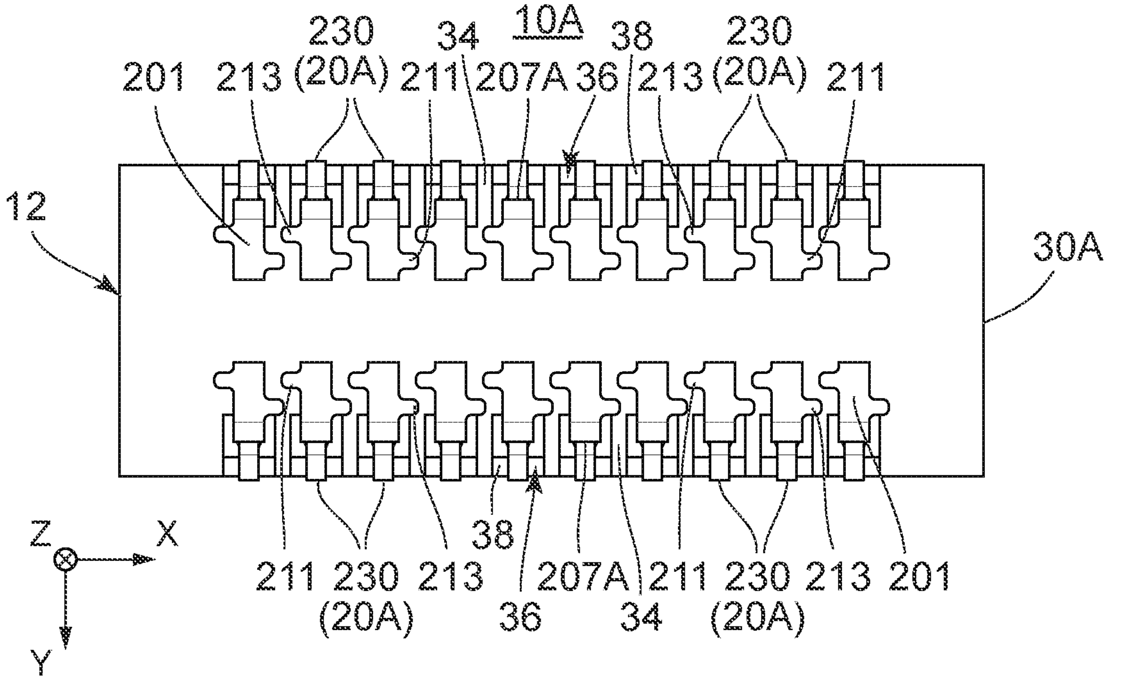
FIG. 19 is a bottom view showing the connector of FIG. 16.
Figure 20:
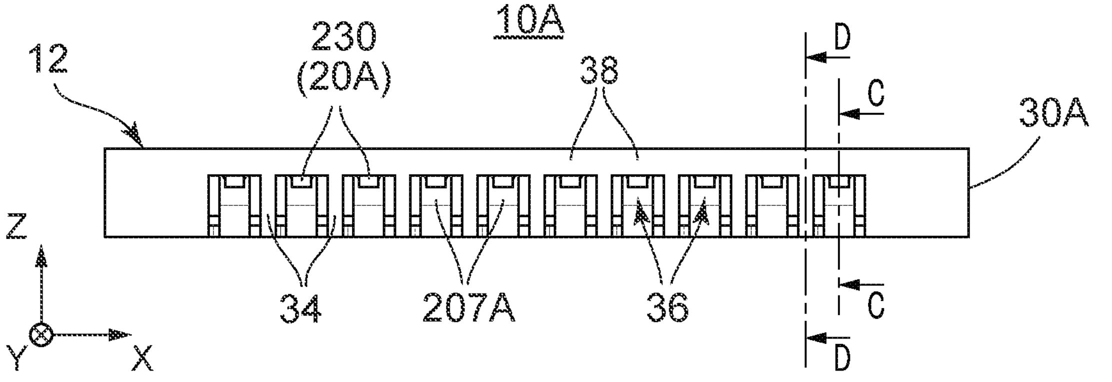
FIG. 20 is a side view showing the connector of FIG. 16.
Figure 21:
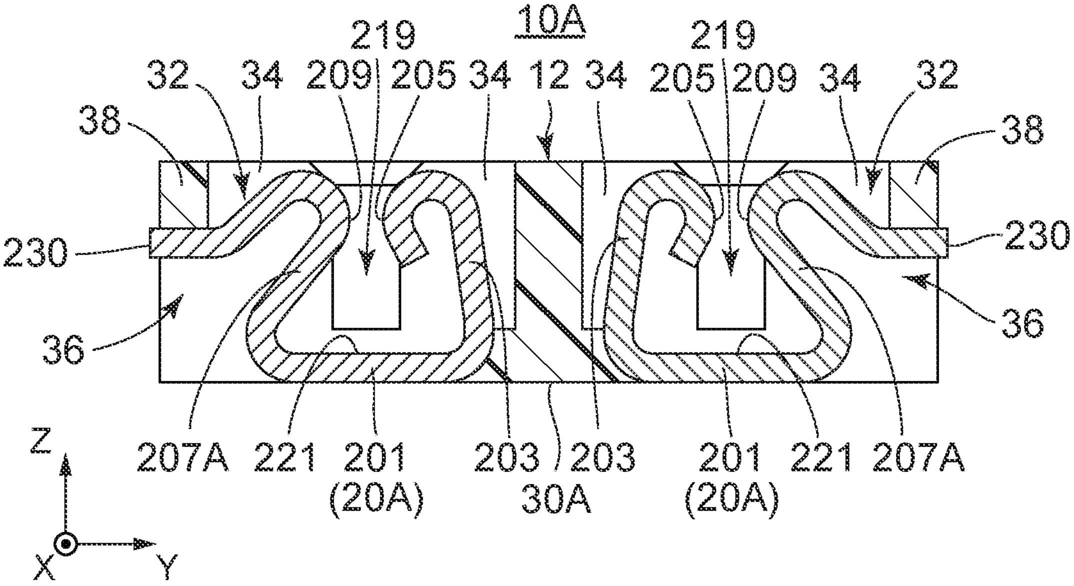
FIG. 21 is a cross-sectional view showing the connector of FIG. 20, taken along line C-C.

As shown in FIGS. 19 and 20, the holding member 30A is provided with admitting portions 36 each of which allows a movement of the extension portion 230. As shown in FIGS. 20 and 21, the holding member 30A has an upper wall portion 38 which is located upward of the extension portion 230 of each of the terminals 20A. The extension portion 230 is movable at least in the up-down direction in the admitting portion 36 due to resilient deformation of the second supporting portion 207A. Upward movement of the extension portion 230 is regulated by the upper wall portion 38. At that time, a part of the extension portion 230 functions as a regulated portion, and the upper wall portion 38 functions as a regulating portion.

Figure 22:
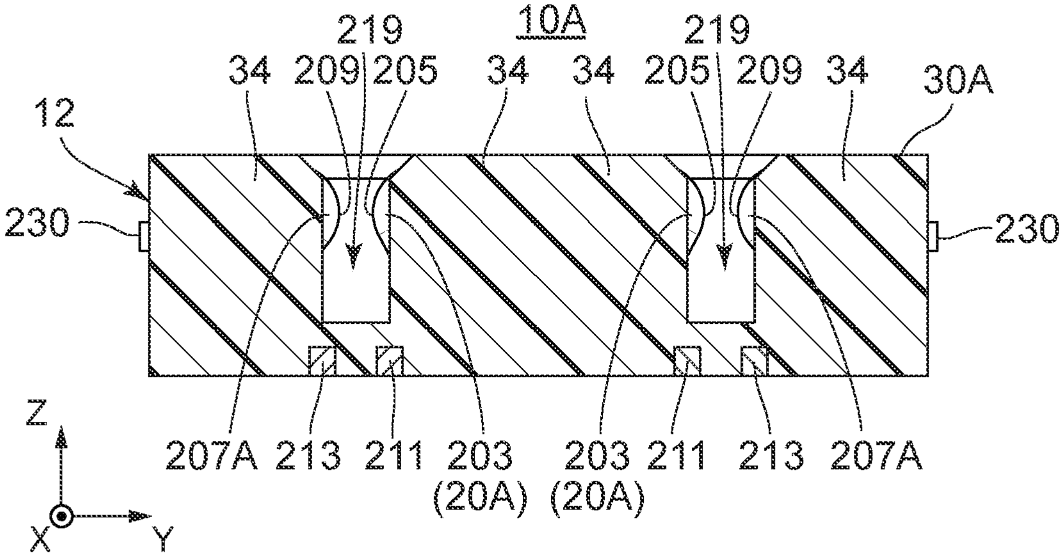
FIG. 22 is a cross-sectional view showing the connector of FIG. 20, taken along line D-D.
Figure 23:
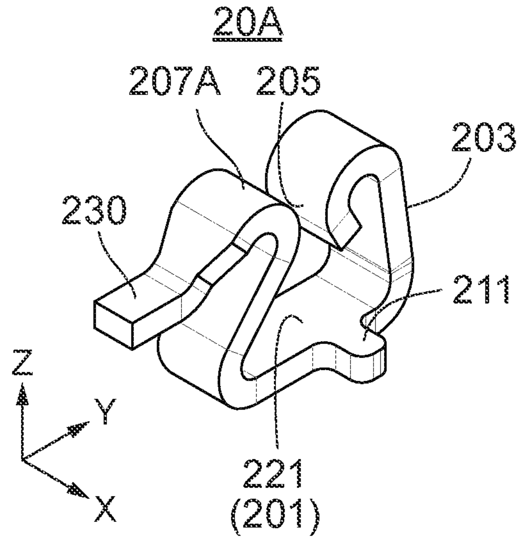
FIG. 23 is a top, perspective view showing one of terminals belonging to one of terminal rows included in the connector of FIG. 16.
Figure 24:
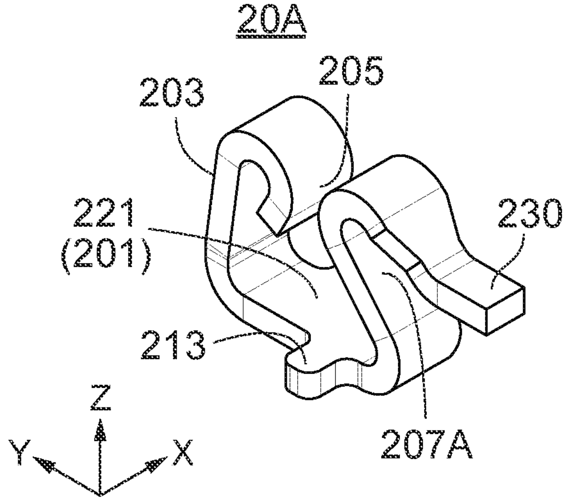
FIG. 24 is another top, perspective view showing the terminal of FIG. 23.
Figure 25:
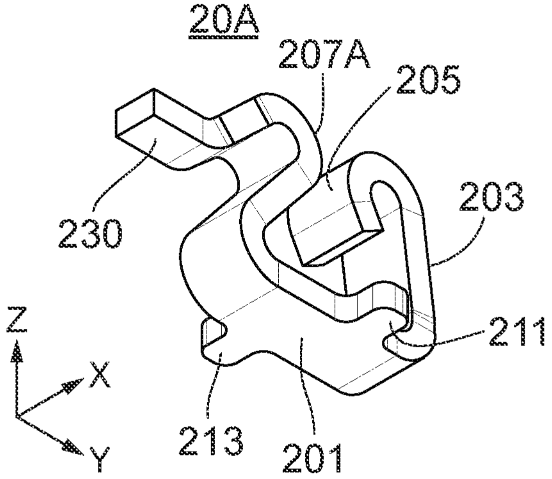
FIG. 25 is a bottom, perspective view showing the terminal of FIG. 23.

As understood from FIG. 22, the first protruding portion 211 and the second protruding portion 213 of each of the terminals 20A are embedded in the holding member 30A. In detail, each of the first protruding portion 211 and the second protruding portion 213 is sandwiched by the holding member 30A in the width direction. In addition, the holding member 30A exists on each of the first protruding portion 211 and the second protruding portion 213. Furthermore, as shown in FIG. 21, the holding member 30A exists under one of end portions of the supporting beam portion 201. Thus, the terminals 20A are held by the holding member 30A.

As understood from FIG. 21, in the connector 10A of the present embodiment, the holding member 30A does not exist on an upper surface 221 of the supporting beam portion 201, so that the upper surface 221 is visible from above. Accordingly, the holding member 30A does not cause reduction of a size of the receiving portion 219 in the up-down direction. Therefore, the connector 10A according to the present embodiment can also be reduced in height.

Although the specific explanation about the present invention is made above with reference to the embodiments, the present invention is not limited thereto but susceptible of various modifications and alternative forms without departing from the spirit of the invention. For example, each of the terminals 20 or 20A may have any shape provided that it has two contact points which face each other and are supported by two supporting portions, respectively. Moreover, the number of the protruding portion(s) of each of the terminals 20 or 20A should be at least one but not limited.

Although each of the connectors 10 and 10A consists of the insert molded body 12 in the aforementioned embodiments, it may be further provided with a metal shell.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising an insert molded body, wherein:
- the insert molded body comprises a plurality of terminals and a holding member;
- the terminals are arranged in a pitch direction;
- each of the terminals has a supporting beam portion, a first supporting portion, a first contact point, a second supporting portion, a second contact point and a protruding portion;
- the supporting beam portion extends in a width direction perpendicular to the pitch direction;
- the first supporting portion extends upward in an up-down direction perpendicular to both the pitch direction and the width direction from one of end portions of the supporting beam portion and has resilience;
- the first contact point is supported by the first supporting portion;
- the second supporting portion extends upward in the up-down direction from a remaining one of the end portions of the supporting beam portion and has resilience;
- the second contact point is supported by the second supporting portion so that the second contact point faces the first contact point in the width direction;
- the protruding portion protrudes from the supporting beam portion in the pitch direction;
- the supporting beam portion has a maximum size same as that of the first supporting portion and as that of the second supporting portion in the pitch direction;
- the protruding portion is embedded in the holding member in part, so that the terminal is held by the holding member; and
- the supporting beam portion is visible from above in the up-down direction.

2. The connector as recited in claim 1, wherein:
- each of the terminals has a regulated portion; and
- the holding member has a regulating portion located upward of the regulated portion.

3. The connector as recited in claim 2, wherein:
- the holding member has a wall portion located between two of the terminals which are adjacent to each other in the pitch direction;
- the regulated portion is a part of the protruding portion; and
- the wall portion is located upward of the regulated portion of the terminal at least in part and functions as the regulating portion.

4. The connector as recited in claim 3, wherein:
- each of the terminals further has a bent portion extending from the protruding portion and a mounting portion extending from the bent portion;
- the protruding portion and the mounting portion are different in position in the up-down direction;
- the bent portion is embedded in the holding member; and
- the bent portion forms the regulated portion together with the part of the protruding portion.

5. The connector as recited in claim 2, wherein:
- each of the terminals has an extension portion extending from a tip of the second supporting portion in the width direction;
- a part of the extension portion functions as the regulated portion;
- the holding member is provided with an admitting portion;
- the extension portion is movable in the admitting portion of the holding member;
- the holding member has an upper wall portion above the extension portion; and
- the upper wall portion functions as the regulating portion.

6. The connector as recited in claim 1, wherein:
- the protruding portion comprises a first protruding portion and a second protruding portion which protrude in opposite directions in the pitch direction;
- in the width direction, the first protruding portion occupies a first region while the second protruding portion occupies a second region; and
- the first region and the second region do not overlap with each other.

7. The connector as recited in claim 1, wherein:
- the protruding portion has an exposed portion which is visible when viewed from above; and
- the exposed portion is adjacent to the supporting beam portion in the pitch direction.

* * * * *